United States Patent

Comly, Jr.

[11] 3,988,936
[45] Nov. 2, 1976

[54] CONVEYOR INDEXING MECHANISM

[75] Inventor: Daniel P. Comly, Jr., Holland, Pa.

[73] Assignee: FMC Corporation, San Jose, Calif.

[22] Filed: May 27, 1975

[21] Appl. No.: 580,644

[52] U.S. Cl. ............................................. 74/34
[51] Int. Cl.² ...................................... F16H 19/04
[58] Field of Search .................... 74/34, 89.14, 422

[56] References Cited
UNITED STATES PATENTS

| | | | |
|---|---|---|---|
| 2,191,605 | 2/1940 | Zehnder | 74/34 |
| 2,441,854 | 5/1948 | Stolp | 74/34 |
| 2,636,391 | 4/1953 | Carter | 74/34 |

Primary Examiner—Samuel Scott
Assistant Examiner—Wesley S. Ratliff, Jr.
Attorney, Agent, or Firm—C. E. Tripp; R. B. Catto

[57] ABSTRACT

A fluid-operated cylinder operates a rack which is in constant mesh with a pinion gear. The pinion gear is mounted on the power input shaft of a fluid-operated jaw clutch, having toothed driving and driven elements, and arranged to engage only when the rack is driven in one direction so that the output shaft of the clutch has intermittent rotary motion in one direction. The rack extends through a stop block and includes an axially adjustable collar which abuts the stop block at one limit of movement of the rack. At the same time, a switch actuator on the rack contacts the actuator of a switch mounted on the stop block to reverse the direction of the rack. In order to adjust the driving stroke of the piston rod in the air cylinder, and hence the driving stroke of the rack, the stop block is provided with a toothed mounting surface and can be selectively positioned along a similarly-toothed mounting plate. By establishing these teeth at a pitch equal to the stroke of the rack for one powered rotation of the clutch driven member, divided by the number of teeth in the jaw clutch, the stop block may be set at any desired position along its mounting plate and yet provide efficient meshing engagement of the toothed driving and driven members. A formula for using a standard pitch cutter to obtain the exact pitch required for the stop block and mounting plate teeth is a part of the disclosure.

1 Claim, 6 Drawing Figures

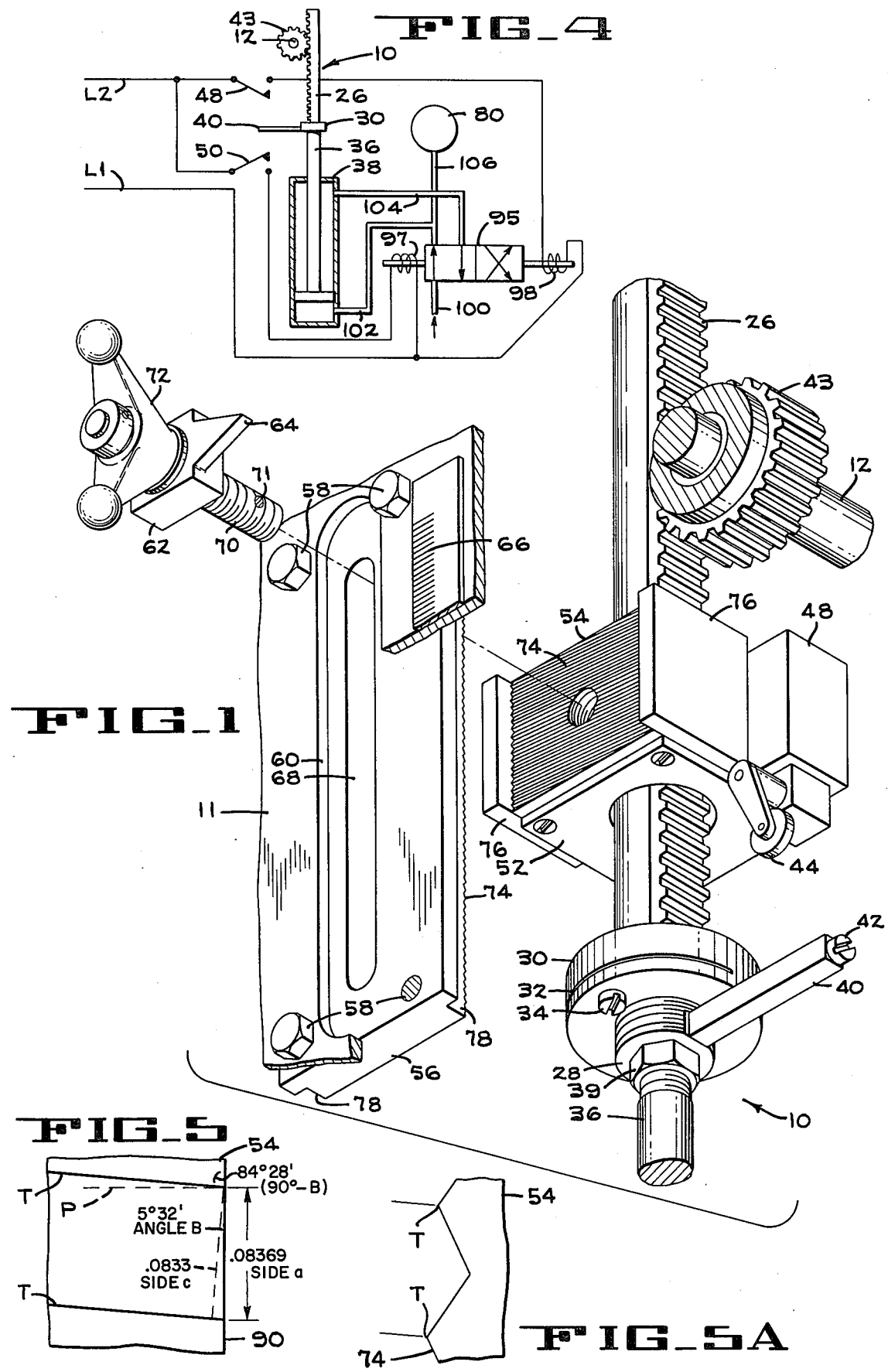

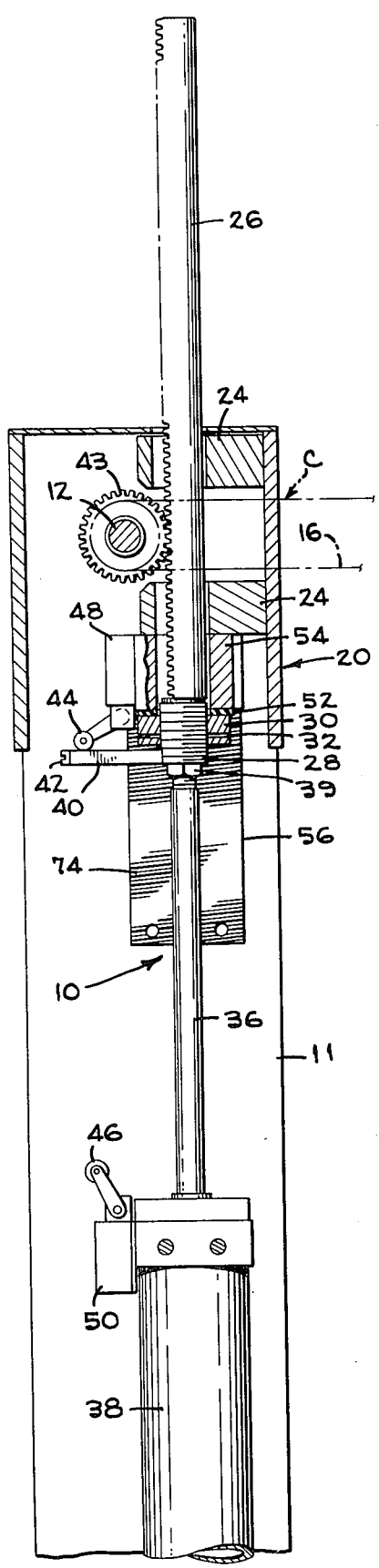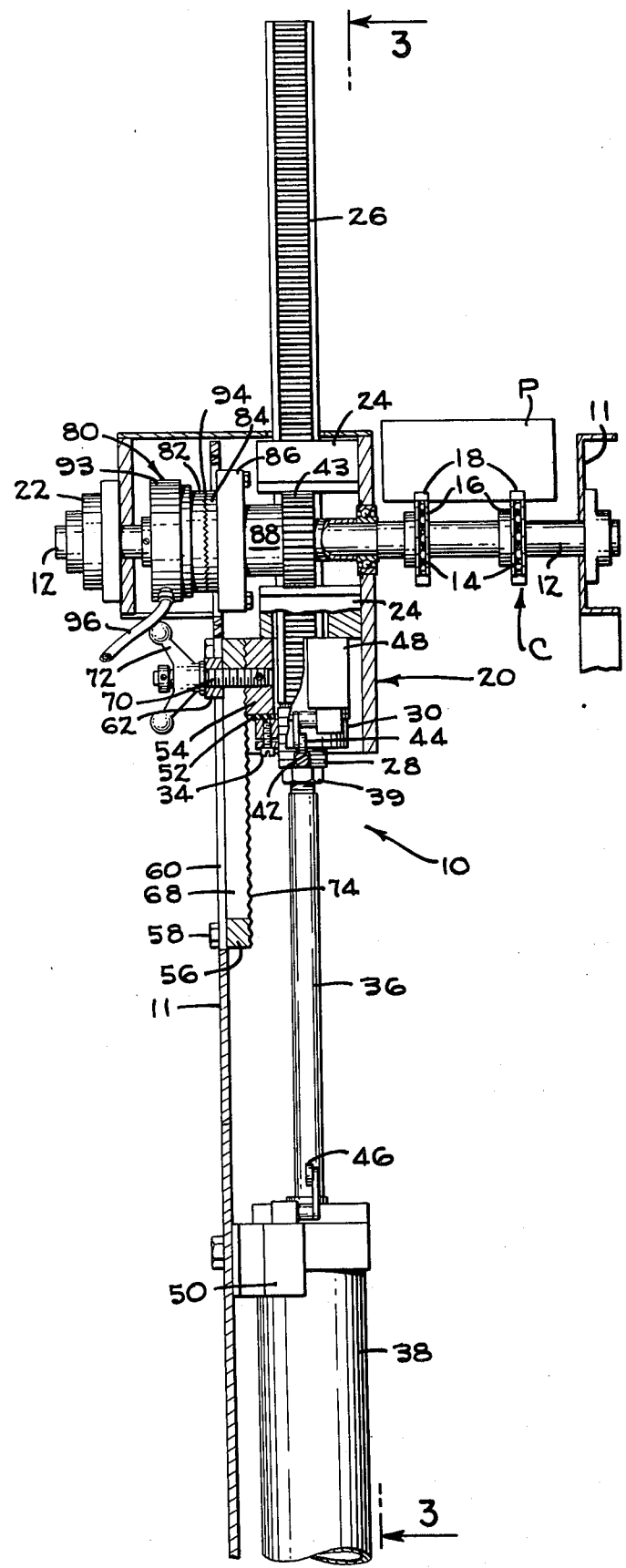

CONVEYOR INDEXING MECHANISM

BACKGROUND OF THE INVENTION

The field of the present invention pertains to drive mechanisms for providing intermittent rotary output. More specifically, the present invention concerns a piston-driven rack wherein a drive stroke of the rack intermittently rotates an output shaft, and wherein the angular driving motion of the output shaft may be preselected by an adjustment in the driving mechanism. The output shaft, for example, may be connected to a workpiece conveyor which is to be intermittently advanced in precisely uniform increments, and wherein the length of conveying motion must be adjustable to index workpieces on the conveyor to a processing station, or to change to other size workpieces.

A prior art drive system according to the outline above is disclosed in the Zwiebel U.S. Pat. No. 3,412,430 issued on November 26, 1968. The patentee disclosed a drive system including a reciprocable rack driving a pinion, and provides for adjustably setting the stroke of the rack without misaligned toothed elements in the system. In one embodiment of the invention disclosed in the patent, the toothed elements are a rack and pinion gear which are intermittently engaged. For this purpose, the rack has one end pivoted to a frame which is reciprocated by a fluid-operated cylinder. A toggle cylinder on the frame is connected to the rack and swings the rack into and out of engagement with the pinion. A second rack is positioned above the movable frame and is contacted by a bolt on the frame to limit the movement of the frame. This second rack has teeth at the same pitch as the first rack and is adjustably locked to a block also having the same pitch teeth. Thus, once the bolt and the second rack are properly adjusted, any relocation of the second rack to change the stroke of the first rack (via the movable frame) will assure that the first rack and its associated pinion will properly mesh when the toggle cylinder causes the rack to pivot against the pinion.

SUMMARY OF THE INVENTION

The present invention is an improvement of the device disclosed in the Zwiebel patent, supra, in that a similar intermittent drive function employing a rack and pinion drive arrangement is achieved with apparatus that eliminates much of the mechanical complexity of the patented device, thus providing a drive system which is less expensive, easier to maintain, and capable of more prolonged accuracy because the fewer movable parts cause the normal wear to have less effect on backlash. These improved results are attained by providing a driven rack in continuous engagement with a pinion gear coupled to a power-actuated, toothed jaw clutch. The clutch is only engaged when the rack is driven in one direction, so that the output shaft of the clutch intermittently rotates in one direction. A stop block adjustably mounted on a fixed mounting plate contacts a collar on the rack to limit the driving stroke of the rack, and the block and plate are provided with meshing teeth. The pitch of these teeth is obtained by dividing the rack stroke which will rotate the clutch one revolution, by the number of teeth on the clutch jaws. Thus, any subsequently adjusted position of the stop block on the fixed mounting plate will assure engagement of the clutch teeth, irrespective of the drive ratio provided by the rack and pinion. This structural arrangement eliminates the second rack, the pivoted first rack, and the movable mounting frame required in the device disclosed in the Zwiebel patent, supra. Further, the present invention provides a mechanically simplified system wherein a stock, off the shelf jaw tooth clutch can be incorporated into a conveyor indexing mechanism having virtually unlimited conveying stroke adjustments without requiring special tooling for manufacturing the mechanism. The latter results are obtained by a particular formula which is disclosed herein, by means of which any required pitch for the teeth on the stop and mounting blocks can be formed with the use of a standard pitch cutter.

BRIEF DESCRIPTION OF THE DRAWINGS

FIG. 1 is an exploded diagrammatic fragmentary perspective of the conveyor indexing mechanism of the present invention, with the clutch and power cylinder omitted.

FIG. 2 is a vertical transverse section through a conveyor system which includes the FIG. 1 conveyor indexing mechanism, the latter being partially broken away to show components which would be otherwise concealed.

FIG. 3 is a section, partly broken away, taken along lines 3—3 on FIG. 2.

FIG. 4 is a schematic control diagram which may be used in conjunction with the conveyor indexing mechanism.

FIG. 5 is a greatly enlarged fragmentary elevation of part of a toothed stop block mounting pad shown in FIG. 1.

FIG. 5A is an elevation of the adjacent edge portion of the FIG. 5 stop block.

DESCRIPTION OF THE PREFERRED EMBODIMENT

FIG. 3 illustrates part of a typical conveying system C which may be driven by the conveyor indexing mechanism 10 of the present invention. The conveyor includes frame plates 11 which mount a driven horizontal conveyor shaft 12 carrying sprockets 14 with endless conveying chains 16 trained around the sprockets. The chains 16 are provided with pusher lugs 18, laterally aligned pairs of which engage and incrementally advance an article, such as a package P. In other applications, the conveyor chains might carry, in lieu of the pushers, grippers for positively engaging the articles conveyed, or pins for penetrating a web or sheet for the same positive drive engagement. In any case, the function of the conveying chains is to provide accurate and adjustable indexing movements of the articles being conveyed between processing stations of the conveyor, and the conveyor indexing mechanism 10 fulfills this function, with the capability of adjusting the conveying movement of the pusher lugs 18 in very small increments over a relatively wide range.

As best shown in FIGS. 2 and 3, one of the frame plates 11 is provided with a downwardly open fabricated housing 20 which supports one of the bearings 22 for the conveyor shaft 12, and has vertically apertured spaced bearing blocks 24 for a reciprocable rack 26. Referring especially to FIG. 1, the rack 26 is provided with a cylindrical lower end 28 which is both exteriorly and interiorly threaded. The outside threads are engaged by a threaded stop collar 30 having a lateral groove 32 and a clamping screw 34 which, when tightened, springs the stop collar into locking engagement onto the cylindrical lower end of the rack.

The internal threads of the lower end 28 of rack 26 are engaged with the threaded end of a piston rod 36 that is associated with a fluid-operated, double-acting cylinder 38 (FIGS. 2 and 3). A lock nut 39 prevents relative rotation of the rack and piston rod. Also fastened to the lower end 28 (FIG. 1) of the rack is a radially extending switch actuator arm 40 which seats on a flat face and is secured by a through-bolt 42. Rotation of the rack 26 is prevented by its engagement with a later mentioned pinion gear 43 so that the switch actuator arm 40 maintains alignment with the roller actuators 44 and 46 of two later mentioned electrical switches 48 and 50. The switches indirectly reverse the driving direction of the piston rod 36.

Upward movement of the rack 26 produces a power stroke for the conveyor C, during which the conveyor chains and pushers 16 and 18 are advanced. At the upward limit of the movement for the rack 26, the stop collar 30 seats against a resilient bumper pad 52 (FIG. 1). The bumper pad is secured to the underside of a stop block 54 which may be secured at a selected elevation relative to a fixed mounting plate 56. For this purpose, the mounting plate 56 is held by bolts 58 to the adjacent frame plate 11 which has a vertical slot 60 for receiving an indicator block 62. Block 62 is provided with a pointer 64 that overlies a stroke-indicating scale 66, the latter being secured to the outer face of the frame plate 11. An elongate slot 68 in the mounting plate 56 slidably receives a threaded stud 70 which has an inner end threaded into and locked by a pin 71 to the stop block 54, and an outer end with a threaded handle 72 for locking the stop block to the mounting plate 56.

In order to positively engage the mating surfaces of the stop block 54 and the mounting plate 56, both the block and plate are provided with fine-pitch teeth 74 extended transversely of the direction of movement of the rack 26. It will be noted that the teeth 74 incline from side to side, and that the stop block 54 is provided with side plates 76 rigidly affixed thereto which slidably engage opposed side surfaces 78 of the mounting plate 56. The inclination of the teeth 74, according to the present invention, enables the use of a standard, off the shelf air operated jaw clutch 80, and a stock cutter for forming the teeth 74, the result of which will permit repositioning of the stop block without interfering with the meshing engagement of the teeth in the jaw clutch. Further according to the present invention, it is possible to employ teeth on the stop block and mounting plate which are relatively small, thus providing for vertical adjustment of the stop block 54 in very small increments so that the pusher stroke is also controlled in small increments of adjustment.

The conveyor shaft 12 (FIG. 3) extends through the jaw clutch 80 and is coupled, by means not shown, to the driven power input element 82 of the clutch. The clutch power output element 84 is provided with a flange 86 that is bolted to the flanged hollow hub 88 of the pinion gear 43 which is in continuous meshing engagement with the rack and rotatable independently of the conveyor shaft 12. The confronting faces of the clutch driving and driven elements 84 and 82, respectively, are formed with gear teeth 94 capable of being meshed or unmeshed according to whether or not air under pressure is applied to an inlet hose 96 that is connected to a fixed housing 93. Thus, when pressurized air is directed into the hose 96, the clutch teeth 94 mesh to connect the pinion gear 43 to the conveyor shaft 12, whereas in the absence of pressure the clutch teeth disengage and the pinion gear 43 can freely rotate relative to the conveyor shaft 12.

According to the present invention, the pitch of the teeth 74 on the stop block 54 and the stop block mounting plate 56 are derived by taking the length of rack (or piston rod) stroke required to rotate the driven element 82 of the clutch 80 for one revolution, and dividing that stroke by the number of teeth 94 on the clutch face. For example, one commercially available jaw clutch (made by Horton Manufacturing Co. of Minneapolis, Minn., Model 5H40) has 122 teeth. The pinion gear 43, driven by the rack 26 and driving the clutch element 82, has 26 teeth with a circular pitch of 0.3927.

Therefore, the rack stroke required to rotate the clutch 80 for one revolution is 0.3927 (the circular pitch of the pinion gear 43) times 26 (the number of teeth on the pinion gear) which equals 10.2102 inches. The rack stroke of 10.2102 inches divided by 122, the number of teeth on the clutch face, equals 0.8369 inches. Accordingly, if the stop block and mounting plate teeth 74 are provided with a pitch of 0.08369 inches, then in every adjusted position of the stop block 54 relative to its mounting plate 56, the clutch teeth 94 will exactly engage.

The movement of the conveyor pushers 18 (FIG. 2) is determined by the size of the conveyor sprockets 14. In the present case, the sprockets have 26 teeth at ½ inch pitch, so each single revolution of the clutch 80 advances the pushers 13 inches. Thus, if the stop block 54 is repositioned one tooth higher than a given position, (0.08369 of an inch higher) the pushers 18 will travel 0.1065 of an inch less than 13 inches, because the pusher stroke of 13 inches divided by 122, the number of clutch teeth, equals 0.1065 of an inch. This will allow adjustment of the conveyor pushers, in either direction, in increments of about only 1/10 of an inch.

It would be expected that either a special cutter or complicated machining would be required to cut the teeth 74 on the stop block 54 and the mounting plate 56 so as to provide the exact pitch correlation necessary between the stop block adjustment teeth 74 and the clutch teeth 94, in order for the clutch teeth to exactly mesh wherever the stop block 52 may be positioned. This is not the case, because according to another feature of the present invention, a standard 12 tooth per inch cutter which forms teeth that are spaced 0.0833 of an inch may be used to obtain the required pitch of 0.08369 inches for the teeth 74. This feature is illustrated and described in connection with FIG. 5, which shows a greatly enlarged portion of the toothed side of the stop block 54 and which is also typical of the toothed side of the mounting plate 56.

The dimension line 0.08369 is the required pitch between the crests of two adjacent teeth T. To obtain this pitch, a standard cutter is employed, but is oriented so as to incline the teeth upward at a specific angle from the side edge 90 of the stop block. The cutter pitch is indicated by the dotted line dimension 0.0833 that is normal to the teeth T, and is the standard pitch for a cutter having 12 teeth per inch.

Considering the edge 90 of the stop block 54 as the hypothenuse (side a) of a right triangle, and the dotted line as the opposite side (side c), it follows that the acute angle B is obtained by dividing side c by side a to obtain the cosine for angle B of 0.99534. From angle function tables, this cosine corresponds to an angle of 5° 32′ from a perpendicular reference line P to the edge 90, or at 84° 28′ (180° −5° 32′−90°) the complementary angle between edge 90 and the perpendicular P. Accordingly, a standard 12 tooth cutter oriented in the manner described will form teeth having the exact pitch necessary for precise meshing of the clutch teeth 94 wherever the stop block 54 may be positioned relative to the mounting plate 56.

It should be evident that the above outlined procedures are applicable to conveying systems with different design parameters than those given herein, for example, a 10 inch conveyor pusher stroke using a jaw clutch with 152 teeth (Model 5H50 of the Horton Co., supra). Again starting with the precept that one revolution of the clutch is to produce the required 10 inch conveyor stroke, the sprockets 14 in this case could be 20 tooth, ½ inch pitch. If the rack 26 and pinion gear 43 operate the same as previously described, dividing the rack stroke of 10.2102 inches by the number of clutch teeth, 152, equals 0.0672, the desired pitch for the stop block and mounting plate teeth 74.

In this case it will be necessary to select a standard cutter having a smaller pitch than the cutter formerly mentioned, so that the hypothenuse side a is greater than the opposite side $c$ (0.0672 > side $c$). A standard 14 tooth cutter has a pitch of 0.07143. Thus, dividing side $c$ (0.07143) by side a (0.08369) gives the cosine of angle B, which is 0.8535. From the table of trigonometric functions, this is found to correspond closely to an angle of 31° 25′ since the actual cosine is 0.8534. Thus, if the cutting angle of 31.° 25′ relative to the perpendicular P is used for the teeth 74, in any adjusted position of the stop block 52, the clutch teeth of the 152 tooth clutch will mesh without trouble. While this is a workable arrangement, in actual practice with a conveyor handling heavy loads it is desirable to keep the stop block adjustment teeth more nearly parallel to the perpendicular reference line P to minimize lateral forces tending to shift the stop block sidewise. It will be evident, therefore, that in any given example including the last, that the rack and pinion ratio, the number of teeth on the jaw clutch, and the cutter for forming the stop block and mounting plate teeth, may and should be selected to result in a tooth pitch wherein the resultant right triangle has a side a (FIG. 5) which only slightly exceeds the length of side $c$, since this will cause the teeth T to closely parallel the perpendicular reference line P; in other words the teeth will be nearly perpendicular to the path of adjusting movement of the stop block.

As previously indicated, when the conveyor indexing mechanism is initially installed, the stop block 54 is located on the mounting plate 56 at a position wherein the rack 26 will rotate the pinion gear 43 one revolution when the stop collar 30 strikes the bumper pad 52. The limit switch 48 is mounted on the stop block 54 and is arranged to close its contacts when the switch actuator 40 contacts the switch roller actuator 44 as the stop collar 30 abuts the bumper pad 52.

With reference to FIG. 4, a typical control circuit may include, for example, a solenoid-actuated air valve 95 wherein alternate energizations of solenoids 97 and 98 reverse the movement of the piston rod 36. Thus, when the switch actuator 40 closes the lower switch 50, the solenoid 97 is electrically connected to input lines L1 and L2 and shifts the valve core so that parallel passages therein communicate with an air supply conduit 100 to pressurize the base end of the air cylinder 38, and vent the upper end of the cylinder to atmosphere via conduits 102 and 104, respectively. At the same time, a conduit 106 is connected to the air supply to energize the clutch 80 for the power stroke of the air cylinder. When the switch actuator 40 closes the upper switch 48 to terminate the power stroke, reverse the piston rod and vent the clutch air supply to disengage the pinion 43 (FIG. 3) from the conveyor shaft 12, the solenoid 98 is energized to shift crossed passages of the valve core into place of the parallel passages. This communicates the air supply conduit 100 with the upper end of the cylinder 38, retracting the piston rod 36, and venting the base of the cylinder plus the clutch 80 to atmosphere.

With the conveyor indexing mechanism in operation to project the piston rod 36, the clutch teeth 94 are meshed and the pinion gear 43 is rotated to turn the conveyor shaft 12 and advance the pushers 18 for whatever length of indexing movement is indicated by the pointer 64 on the scale 66. At the end of the piston rod power stroke, the stop collar 30 strikes the bumper pad 52 to stop driving rotation of the pinion gear 43, and the switch 48 is actuated to direct air into the piston rod end of the air cylinder 38, and to exhaust air from the clutch so that its teeth disengage. The rack 26 is thus continuously reciprocated, with each movement of the rack away from the cylinder 38 resulting in a power stroke to advance the conveyor pushers 18, and the other movement of the rack returning the rack for a power stroke while disengaging the pinion gear from the conveyor.

From the preceding description of a preferred embodiment of the invention, it will be evident that the conveyor indexing mechanism provides a relatively simple and inexpensive driving mechanism capable of being adjusted to close tolerances over a wide range of stroke lengths, with particular utility as an indexing mechanism for an intermittently driven conveying system.

Although the best mode contemplated for carrying out the present invention has been herein shown and described, it will be apparent that modification and variation may be made without departing from what is regarded to be the subject matter of the invention.

What is claimed is:

1. Conveyor indexing mechanism comprising a conveyor, a rack and pinion gear in constant mesh, means for longitudinally reciprocating said rack, a power operated jaw clutch including a driven element connected to said conveyor and a driving element connected to said pinion gear, said clutch elements having a plurality of radially disposed mating teeth, control means connected to said clutch for engaging said driving and driven elements during only one direction of said longitudinal movement of said rack, a stop plate for limiting the rack movement in said one direction, said stop plate having a planar face formed with a plurality of transversly extending teeth, a corresponding toothed mounting plate, and means for adjustably mounting said stop plate on a longitudinal path along said mounting plate, the pitch of adjacent teeth on said stop plate and its mounting plate, as measured along said adjustment path, being derived from the piston rod stroke required to rotate said clutch for one revolution divided by the number of clutch teeth on said driving and driven clutch elements, said teeth on said stop and mounting plates being disposed at an angle relative to a line that is normal to the linear path of adjusting movement of said stop plate on said mounting plate, said teeth having the pitch of a standard cutter as measured along a line normal to the crest lines of adjacent teeth so that the stop plates can be precisely machined by standard cutters to be compatible with said clutch teeth by selecting the angle of disposition of said teeth on said plates.

* * * * *

UNITED STATES PATENT OFFICE
CERTIFICATE OF CORRECTION

PATENT NO. : 3,988,936
DATED : November 2, 1976
INVENTOR(S) : DANIEL P. COMLY, JR.

It is certified that error appears in the above-identified patent and that said Letters Patent are hereby corrected as shown below:

Col. 4, line 23, change "0.8369" to --.08369--.

Signed and Sealed this

Twenty-sixth Day of April 1977

[SEAL]

Attest:

RUTH C. MASON
Attesting Officer

C. MARSHALL DANN
Commissioner of Patents and Trademarks